May 30, 1972

3,666,349

Filed Aug. 7, 1970

INVENTOR
LAURENCE M. HUBBY, JR.

BY Roland J. Griffin

ATTORNEY

INVENTOR
LAURENCE M. HUBBY, JR.
BY Roland I. Griffin
ATTORNEY

United States Patent Office 3,666,349
Patented May 30, 1972

3,666,349
OPTICAL RESONATOR HAVING ACOUSTO-OPTIC OUTPUT COUPLING MEANS
Laurence M. Hubby, Jr., 555 Middlefield Road, Apt. P104, Mountain View, Calif. 94040
Filed Aug. 7, 1970, Ser. No. 61,948
Int. Cl. G02f 1/24
U.S. Cl. 350—149
11 Claims

ABSTRACT OF THE DISCLOSURE

Devices employing optical resonators having a path for a resonant light beam are disclosed. An acousto-optic light filter is disposed in the resonant light path of the resonator for collinearly diffracting the light beam on the acoustic wave to shift the polarization of at least some of the resonant light within the optical bandpass of the filter from a first polarization to a second polarization. A polarization analyzing means is also disposed in the resonant light path for spatially separating the light according to the polarization thereof and for diverting light of one of the polarizations out of the resonant light beam of the optical resonator while retaining light of the other polarization in the resonant light beam. The frequency of the light coupled out of the optical resonator may be varied by varying the frequency of the acoustic wave in the acousto-optic filter, whereas the amount of light coupled out of the resonator may be varied by varying the power density of the acoustic wave within the acousto-optic element.

BACKGROUND OF THE INVENTION

Heretofore, the output coupling of resonant light from an optical resonator has been varied by means of a rotatable retardation plate disposed in the path of the resonant light beam. The retardation plate was rotatable to variably control the amount of the resonant light rotated from a first polarization to a second orthogonal polarization. A polarizing beam splitter was disposed in the path of the resonant light beam for spatially separating light of the first polarization from light of the second orthogonal polarization. The separated light of the orthogonal polarization was diverted from the light beam while retaining in the resonator light of the first polarization. Such a variable output coupler is described in an article titled "Laser Variable Output Coupler," appearing in Applied Optics, vol. 6, No. 3, p. 578 of March 1967. One of the problems of this prior art variable output light coupler is that it is relatively narrow band due to the narrow band characteristics of the retardation plate and of the polarizing beam splitter. Moreover, the prior art output coupler was mechanically variable and its action was relatively slow compared to electronically tunable devices.

It is also known from the prior art that acousto-optic filters, which are electronically tunable, may be employed for shifting the polarization of a light beam, falling within the optical bandpass of the filter, from a first polarization to a second orthogonal polarization. Such filters are electronically tunable as the bandpass frequency of the filter may be varied by varying the RF frequency of the acoustic wave within the filter. Such prior art filters are disclosed in an article titled "Acousto-Optic Tunable Filter" appearing in the Journal of the Optical Society of America, volume 59, No. 6 of June 1969, pages 744–747 and in an article titled "Electronically Tunable Acousto-Optic Filter" appearing in the Applied Physics Letters, vol. 15, No. 10, of Nov. 15, 1969, pages 325 and 326.

SUMMARY OF THE INVENTION

The principal object of the present invention is the provision of an improved output coupling means for optical resonators and apparatus using same.

One feature of the present invention is the provision, in the resonant light beam path of an optical resonator, of an acousto-optic filter for collinearly diffracting the resonant light on an acoustic wave to shift the polarization of at least some of the resonant light within the optical passband of the filter from a first polarization to a second polarization and the provision of a polarization analyzing means disposed in the resonant light path for spatially separating the light according to its polarization and for diverting light of one of the separated polarizations out of the resonant light path while retaining light of the other polarization in the resonant light path.

Another feature of the present invention is the same as the preceding feature wherein the acoustic power density of the acoustic wave within the acousto-optic filter is varied to vary the amount of resonant light coupled from the resonant light path of the optical resonator.

Another feature of the present invention is the same as any one or more of the preceding features wherein the frequency of the acoustic wave within the acousto-optic filter is varied to vary the frequency of the resonant light coupled out of the resonant light path of the optical resonator.

Another feature of the present invention is the same as any one or more of the preceding features wherein the polarization analyzing means includes a birefringent polarizing prism, whereby broad band optical operating characteristics are obtained.

Other features and advantages of the present invention will become apparent upon a perusal of the following specification taken in connection with the accompanying drawings wherein:

DESCRIPTION OF THE PREFERRED EMBODIMENT

Figure 1:
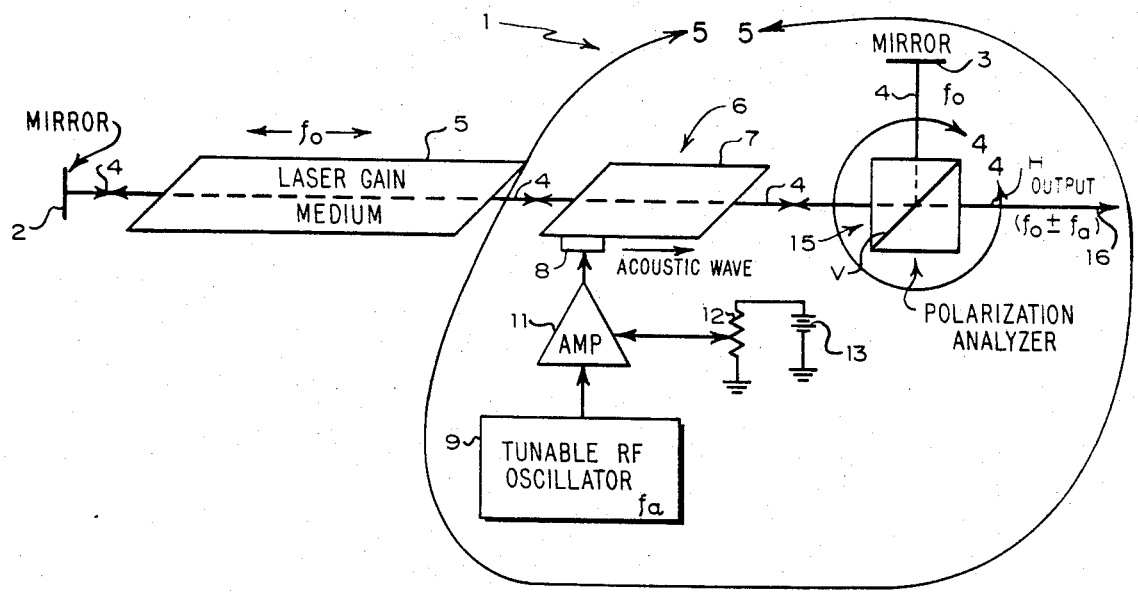
FIG. 1 is a schematic line diagram, partly in block diagram form, depicting an optical maser employing an acousto-optic output coupling means of the present invention.

Referring now to FIG. 1, there is shown a laser or optical maser 1 incorporating features of the present invention. The optical maser 1 includes a pair of mirrors 2 and 3 disposed at opposite ends of an optical beam path 4 of a resonant light beam. A gain medium 5, such as a gain tube filled with a suitable gain medium such as helium-neon, argon, or certain organic dye mixtures, is excited by conventional electrical, optical, or chemical means to produce coherent oscillation of a resonant light beam traversing the beam path 4 of the optical resonator defined between mirrors 2 and 3.

An acousto-optic light filter 6 is disposed in the beam path 4 of the resonant light beam. The acousto-optic light filter 6 includes an optically anisotropic medium 7, such as a birefringent crystal. Suitable birefringent crystals include $LiNbO_3$, $PbMoO_4$, or $CaMoO_4$. An acoustic transducer 8 is affixed to the crystal 7 near one end thereof for generating an acoustic shear wave which is reflected from the input optical face of the crystal 7 longitudinally of the crystal in a direction collinear with the beam path 4. The acoustic wave has a frequency $f_a$ determined by the output of a tunable RF oscillator 9 which is fed to a power amplifier 11, and thence to the acoustic transducer 8 for determining the drive frequency of the acoustic wave within the crystal 7. The acoustic power density of the acoustic wave within the crystal 7 is variably controlled by means of a variable voltage derived from a potentiometer 12 supplied with voltage from a battery 13. The derived voltage is fed to the gain control input of the power amplifier 11.

In the acousto-optic filter 6, the resonant light beam is collinearly diffracted on the acoustic wave to shift the polarization of at least some of the resonant light beam within the optical passband frequencies of the optical filter 6, from a first polarization to a second orthogonal polarization.

A birefringent beam splitting polarization analyzing prism 15 is disposed in the beam path 4 of the resonant light beam. The polarization analyzing prism 15 serves to spatially separate incident light according to the polarization of the light. More specifically, assuming that the filter element 6 is arranged to receive incident light of a vertical polarization and to collinearly diffract light, within the bandpass of the optical filter 6, to horizontal polarization, then the polarization analyzing prism 15, such as a Glan-Taylor prism or a Rochon prism or a McNeille Beamsplitter, would be arranged to reflect light of the vertical polarization while passing therethrough light of the orthogonal horizontal polarization as an output beam 16. In this manner the polarization analyzing prism 15 serves to divert from the optical beam path 4 light of an optical frequency falling within the passband of the filter 6.

The amount of the light diverted from the resonant light beam 4 and thus the optical resonator is determined by the acoustic power density within the optical filter 6. In a typical example, the acoustic power density would be relatively low such that a relatively small fraction, such as 1-2%, of the incident light beam 4 is diffracted into the horizontal polarization to pass through the polarization analyzing prism 15 as output beam 16. The amount of output light coupled out of the resonator is determined by the acoustic power density within the acoustic filter 6 as determined by the power gain of the driving amplifier 11 and it may be adjusted by adjusting the potentiometer 12.

The optical resonator and the particular gain medium 5 may be capable of supporting light beams at several different optical frequencies over a relatively wide band of optical frequencies such as within the range of optical frequencies corresponding to optical wavelengths from 5500 to 7000 angstroms. The optical bandpass frequency of the bandpass acousto-optic filter 6 is electronically tunable, for example, over the relatively wide range of optical wavelengths previously mentioned, in the case of a $LiNbO_3$ crystal 7, by varying the frequency of the tunable RF oscillator over a relatively wide range of frequencies from 550 to 1050 megahertz. When the bandpass frequency of the tunable filter 6 corresponds to a resonant line of the optical maser 1, an output beam 16 will appear. The optical frequency of the output beam 16 is actually slightly displaced in frequency from the resonant light beam frequency $f_0$ by the acoustic frequency $f_a$ due to operation of acousto-optic filter 6. However, this frequency displacement is normally very small compared to the optical frequency such that the frequency difference $f_a$ is typically not discernible.

Figure 2:
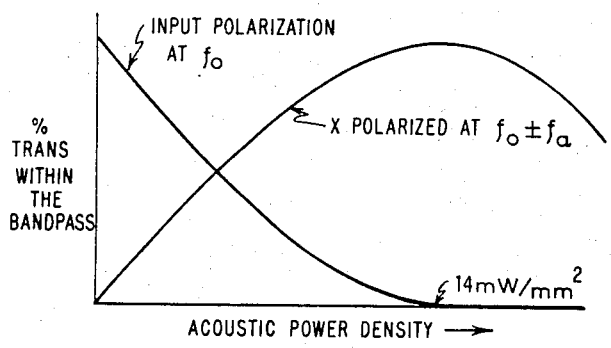
FIG. 2 is a plot of percent light transmission at the bandpass optical frequency of an acousto-optic filter versus acoustic power density in the acousto-optic filter and depicting the transmission characteristics for light of the same polarization as the input light and light of a polarization orthogonal to that of the input light.
Figure 3:
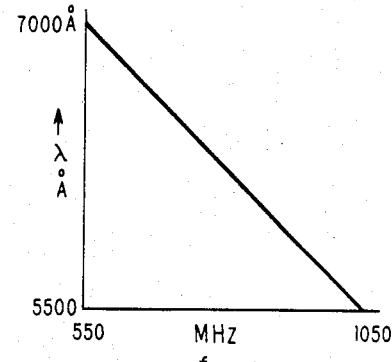
FIG. 3 is a plot of bandpass wave length $\lambda$, in angstroms, versus frequency of the acoustic wave within the acousto-optic filter of FIG. 1, and depicting the turnability of the filter.

Referring now to FIGS. 2 and 3 the bandpass and tunable characteristics of the acousto-optic filter 6 are shown in greater detail. FIG. 2 shows the percent transmission within the passband of the acousto-optic filter 6, and FIG. 3 shows the tunability of the passband optical wavelength of the filter as a function of the frequency of the acoustic wave $f_a$. Thus, it is seen with a relatively low acoustic power density within the crystal 7, substantially all of the light incident on the filter 6 passes therethrough and is reflected from the polarization analyzer to the mirror 3 to return and remain within the path of the resonant light beam of the optical resonator. At low power density within the filter 6 a relatively small amount of the incident light is converted to the cross-polarization, is shifted by the acoustic frequency, and passes through the polarization analyzing prism 15 as output beam 16. The filter 6 is tunable, in the case of $LiNbO_3$, from 5500 angstroms to 7000 angstroms by varying the frequency of the acoustic wave $f_a$ from 550 megahertz to 1050 megahertz.

The acousto-optic filter 6 is of the type disclosed in the above-cited "Journal of the Optical Society of America" article and briefly makes use of collinear acousto-optic diffraction in an optically birefringent medium. More particularly, a crystal orientation for crystal 7 is chosen such that a small fraction of the incident linearly polarized light beam 4 is diffracted on the acoustic wave from the input polarization into a second orthogonal polarization. For a given acoustic frequency, only a small range of light frequencies satisfy a momentum vector, $k$, matching condition to be cumulatively diffracted to the second polarization. If the acoustic frequency is changed, the band of light frequencies which the acousto-optic element will diffract from the input polarization to the second orthogonal polarization is changed. Diffraction into the second orthogonal polarization occurs via the photo-elastic constant of the crystal material and is only cumulative if $|k_o|-|k_e|=k_a$ where the subscripts o, e and a denote the ordinary and extraordinary optical waves and the acoustic wave, respectively. This will be the case if the optical and RF acoustic frequencies $f_o$ and $f_a$ are related by:

$$f_o = \frac{cf_a}{V|\Delta n|} \quad \text{Eq. (1)}$$

where $c/V$ is the ratio of the optical velocity in vacuum to the acoustic velocity in the medium, and $\Delta n$ is the birefringence of the crystal.

The half-power bandwidth of the optical passband through the optical filter is defined by the following relation:

$$B.W. \cong \frac{1}{|\Delta n|L} \text{ cm.}^{-1} \quad \text{Eq. (2)}$$

where B.W. is the half-power bandwidth in wave numbers per centimeter of the passband, L is the interaction length of the optical and acoustic fields within the crystal, and $\Delta n$ is the birefringence of the crystal.

Figure 4:
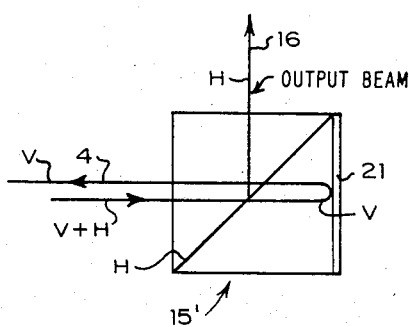
FIG. 4 is a schematic line diagram of an alternative embodiment of a portion of the structure of FIG. 1 delineated by line 4—4 thereof.

Referring now to FIG. 4 there is shown an alternative embodiment of the present invention. The embodiment of FIG. 4 is essentially the same as that of FIG. 1 with the exception that the beam splitting polarization analyzing prism 15' is altered to reflect light of the polarization orthogonal to the polarization of the resonant light beam 4 as output beam 16 and to pass light of the polarization of the resonant light beam 4. The end face 21 of the prism 15' is coated with a reflective coating for reflecting the resonant light beam 4 such that the reflective coating 21 acts as one end mirror of the optical resonator. Thus, the embodiment of FIG. 4 has the advantage of dispensing with the requirement for a separate mirror 3.

Figure 5:
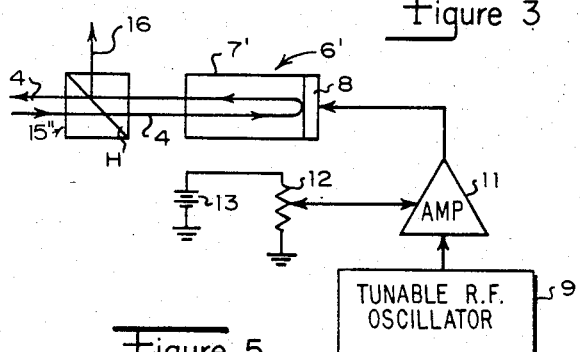
FIG. 5 is a schematic line diagram, partly in block diagram form, of an alternative embodiment of a portion of the structure of FIG. 1 delineated by line 5—5 thereof.

Referring now to FIG. 5 there is shown still another alternative embodiment of the present invention. The embodiment of FIG. 5 is substantially the same as that of FIG. 1 with the exception that the portion of the system of FIG. 1 delineated by line 5—5 is replaced by the structure of FIG. 5. In the embodiment of FIG. 5, the acousto-optic filter 6' is of the type disclosed in the above-cited "Applied Physics Letters" article of Nov. 15, 1969. In this acousto-optic filter, the birefringent crystal 7' has its end faces cut at 90° to the longitudinal axis of the crystal, and the acoustic transducer 8 is affixed to the far end of the crystal 7'. A light reflective coating is provided at the interface of the acoustic transducer 8 with the crystal 7' such that the reflective coating defines one end mirror of the optical resonator for reflecting the resonant light beam over the beam path 4 of the optical resonator. The birefringent crystal 7' may or may not, as desired, be made acoustically resonant. If it is desired to tune the acoustic resonator over a relatively wide band of acoustic frequencies, as of from 550 to 1050 megahertz, in a continuous manner then crystal 7' is preferably not made acoustically resonant. The polarization analyzing prism 15" is arranged in the resonant light beam path 4 in such a manner as to pass incident light of a first polarization and to reflect light converted by the acousto-optic filter 6' from the first polarization to a second orthogonal polarization. The light shifted from the first polarization to the second orthogonal polarization, such as the horizontal polarization, is reflected by prism 15" out of the path of the acousto-optic resonator as output beam 16.

Figure 6:
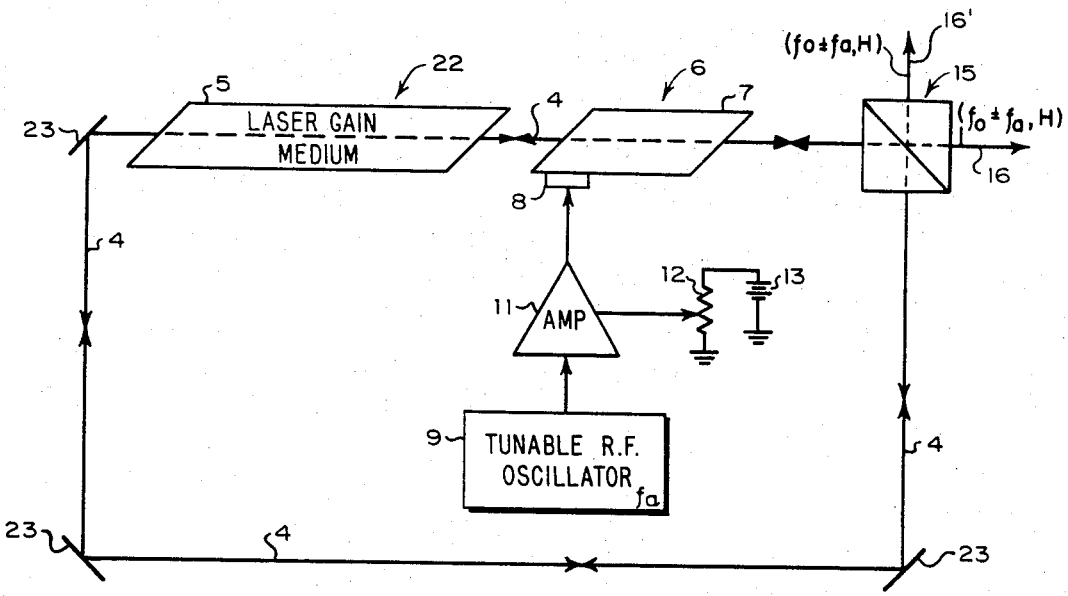
FIG. 6 is a schematic line diagram, partly in block diagram form, depicting a ring laser incorporating features of the present invention.

Referring now to FIG. 6, there is shown an optical ring maser system 22 incorporating features of the present invention. The optical ring maser system 22 is substantially the same as that previously described with regard to FIG. 1 with the exception that mirrors 23 are provided in co-operation with the polarization analyzing prism 15 to cause the optical resonant beam path 4 to form a closed loop. The polarization analyzing prism 15 is disposed at one of the corners of the optical resonant beam path 4. It is arranged such that light which is within the passband of the filter 6 and which is not shifted from the first polarization to the second polarization is reflected from the prism 15 and retained in the optical resonant beam path 4. On the other hand, light which has been shifted from the first polarization, such as the vertical (V), to the second polarization, such as the horizontal (H), by the filter 6 is passed through the polarization analyzing prism 15 as output beam 16.

Light which is traveling around the optical resonant beam path 4 in the counterclockwise direction, which is within the passband of the filter 6, and which has been converted from the first polarization, such as the vertical (V), to the second polarization, such as the horizontal (H), passes out of the optical resonant beam path 4 via prism 15 as output beam 16'. As in the optical maser 1 of FIG. 1, the frequency of the light coupled out of the optical resonant beam path 4 as output beam 16 and 16', may be varied by tuning the acoustic frequency of the tunable RF oscillator 9 and the amount of light coupled out of the optical resonant beam path 4 in the beams 16 and 16', may be varied by varying the gain of the power amplifier 11 to vary the power density of the acoustic wave within the birefringent crystal 7. It is to be noted that the spatially separated output beams 16 and 16' are displaced in optical frequency by twice the acoustic frequency, one being shifted up in frequency and the other being shifted down in frequency by $f_a$.

Figure 7:
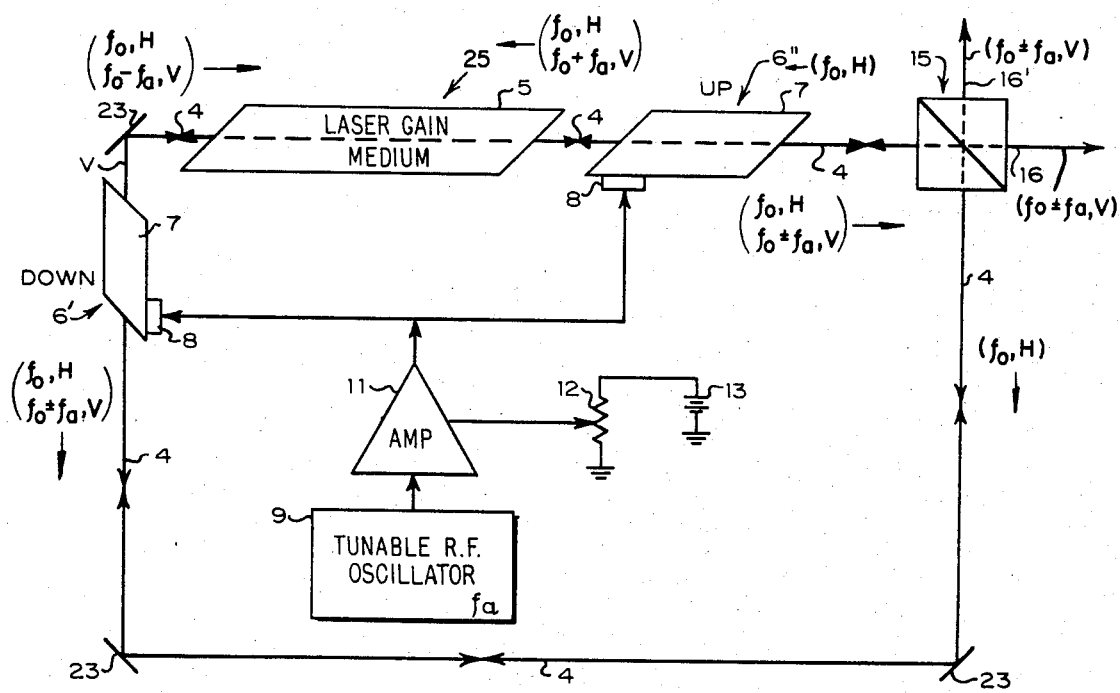
FIG. 7 is a schematic line diagram, partly in block diagram form, depicting an alternative ring laser incorporating features of the present invention.

Referring now to FIG. 7, there is shown another embodiment of an optical ring master 25 employing features of the present invention. The optical ring maser 25 is substantially the same as that shown with regard to FIG. 6 with the exception that a pair of acousto-optic filters 6' and 6" are driven with sufficient power such that the acoustic power density within the filters 6' and 6" is relatively high to provide substantially 100% shift of the light, within the passband, of the incident polarization to output light of an orthogonal polarization. For example, if the light incident upon the crystal 7 is vertically polarized (V), the output light within the passband of the filter 6' or 6" is horizontally polarized (H). Polarization analyzing prism 15 is accordingly arranged to reflect light of the horizontal polarization (H), to thereby determine the polarization of the light retained within the resonant optical beam path 4 of the optical ring resonator.

In operation, assuming light of a horizontal polarization (H) within the passband of the acousto-optic filters 6' and 6" is traveling in the clockwise direction and is incident upon the first acousto-optic filter 6', this light is substantially entirely converted to vertical polarization (V) and converted down in frequency by the acoustic frequency $f_a$. This light continues to travel with vertical polarization (V) in the clockwise direction through the laser gain medium 5 and thence to the second acousto-optic filter 6" which is arranged with crystal 7 having an orientation identical to that of the first acusto-optic filter 6' in order to convert the optical frequency of the light within the bandpass of the filter 6" up in frequency by the acoustic frequency $f_a$, while at the same time shifting the polarization of the light from the vertical (V) to the horizontal (H). This light is then reflected from the polarization analyzing prism 15 in the clockwise direction back around the resonant optical beam path 4.

A small portion of the light which is within the passband of the filters 6', 6" and which is down converted by filter 6' and which is not up converted and shifted in polarization by the second filter 6" passes out of the optical resonator via the polarization analyzing prism 15 as output beam 16. Conversely, the counterclockwise rotating resonant light beam which is up converted by acousto-optic filter 6" and which is not entirely down converted and converted in polarization by acousto-optic filter 6' is separated from the counterclockwise rotating resonant light beam by polarization analyzing prism 15 as output beam 16'. The optical frequency will be up converted if the incident polarization vector of the light lies in the direction of smaller index of refraction and the light and acoustic waves travel in the same direction. If either the polarization or the relative directions of travel of light and acoustic waves are changed, but not both, the optical frequency will be down converted. If both are changed, the optical frequency will be up converted.

In the ring laser system, both crystals are oriented the same way and the acoustic waves travel in the same direction in both of them. Thus, light going in one direction is up converted in one crystal, passes through the laser active medium and is then down converted in the second crystal, back to its original frequency. Light traveling in the opposite direction encounters the second crystal first and is down converted. It proceeds through the laser active medium and encounters the first crystal, where it is up converted back to its original frequency.

As used herein, "light" is defined to mean electromagnetic radiation. Such light may not be confined to the visible spectrum. Likewise, "optical" need not be confined to the visible spectrum.

The benefits of collinear diffraction are: (1) the stringent angular tolerance characteristic of Bragg diffraction is relaxed so that angular divergence of the incident light beam contributes only a second order shift in the passband which is a cosine of the angle between the acoustic K vector and the incident optical K vector; (2) the interaction volume of the acoustic and optical beams is enhanced because of the collinear propagation so that the efficiency of light conversion can be increased to nearly 100 percent and the acoustic power required for efficient conversion drastically decreased.

In some birefringent crystals the phase velocity K vector and the group velocity are not collinear. The angle between them may be as much as 20°, as in the case of quartz. In such a case, the light beam may be collinear with either the phase or the group velocity with corresponding advantages and disadvantages.

If the light beam is collinear with the phase velocity, the advantage of cosine dependence of bandwidth center frequency upon divergence is retained with the disadvantage that the light beam soon walks out of the acoustic beam because the energy propagates in the direction of the group velocity and is not collinear with the light beam. Thus, narrow band characteristics can be obtained in this case at the expense of either larger acoustic aperture or higher acoustic power.

On the other hand, if the light beam is made collinear with the group velocity, the advantage of efficient utilization of acoustic energy is retained but the angle between the acoustic K vector and the optical K vector is no longer zero and the shift in the center of the optical passband with divergence in the optical beam is a function of the cosine of the angle between the acoustic and optical K vectors which is no longer zero. This results in a wider passband with the same angular divergence. In intermediate cases where propagation is neither exactly collinear with either the phase or the group velocity, corresponding tradeoffs occur. In those birefringent crystals in which the phase velocity and group velocity are collinear, non-collinear propagation of light in the filter contributes similar deleterious effects to the filter. Therefore, as used herein, substantially collinear means that the light and acoustic K vectors are sufficiently collinear to retain the advantages of efficient acoustic power utilization and consistent with the required passband filter characteristics.

As seen from Eq. (2) above, the bandwidth of the acousto-optic filter is inversely related to the length of the interaction path L through the crystal. In resonant acousto-optic filters the path length can be relatively short and, thus, the bandwidth is relatively wide. In such cases the K vectors for the optical and acoustic waves can have substantial divergence while still retaining the benefits of collinear diffraction since the acousto-optic interaction is relatively high Q and the interaction falls off only as the cosine of the angle of divergence.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. In an optical resonator having a resonant light path for a resonant light beam, acousto-optic means disposed in said resonant light path for substantially collinearly diffracting the resonant light beam on a substantially collinear, continuous acoustic wave to shift the polarization of at least some of the resonant light beam at an optical frequency that is a function of the acoustic frequency from a first polarization to a second polarization, and polarization analyzing means disposed in said resonant light path for spatially separating light of the first and second polarizations according to the polarization thereof and for diverting light of one of the separated polarizations out of the resonant light path while retaining light of the other of the separated polarizations in the resonant light path.

2. The optical resonator of claim 1 including means for varying the acoustic power density of the acoustic wave within said acousto-optic means to vary the amount of the resonant light shifted from the first polarization to the second polarization and thus the amount of light diverted from said resonant light path.

3. The optical resonator of claim 1 including means for varying the frequency of the acoustic wave within said acousto-optic means to vary the frequency of the resonant light shifted from the first polarization to the second polarization and thus the frequency of the light diverted from said resonant light path.

4. The optical resonator of claim 1 wherein said polarization analyzing means includes a birefringent polarizing prism.

5. The optical resonator of claim 1 wherein the optical resonator is a ring resonator having a closed loop resonant light path for the resonant light beam and wherein said acousto-optic means includes a pair of acousto-optic devices disposed in tandem in said closed loop resonant light path of the ring resonator, each of said acousto-optic devices including an optically anisotropic medium and being positioned to collinearly diffract the resonant light beam on a substantially collinear, continuous acoustic wave therein.

6. The optical resonator of claim 5 wherein said optically anisotropic medium is an optically birefringent crystal.

7. The optical resonator of claim 1 wherein said acousto-optic means includes an optically anisotropic medium and means for exciting the collinear acoustic wave in said optically anisotropic medium.

8. The optical resonator of claim 7 wherein said optically anisotropic medium comprises a birefringent crystal.

9. The optical resonator of claim 1 wherein the optical resonator is a ring resonator having a closed loop resonant light path for supporting counter rotating resonant light beams, wherein said polarization analyzing means spatially separates the light diverted from said closed loop resonant light path into first and second output beams, one for each of the counter rotating resonant light beams, and wherein said acousto-optic means is disposed in said closed loop resonant light path relative to said polarization analyzing means such that the optical frequencies of the first and second output beams are separated by a frequency which is a function of the frequency of the acoustic wave in said acousto-optic means.

10. The optical resonator of claim 9 wherein said polarization analyzing means comprises a polarizing beam splitter.

11. The optical resonator of claim 10 wherein said beam splitter is a polarizing prism.

References Cited

UNITED STATES PATENTS

| 3,524,145 | 8/1970 | Fowler | 331—94.5 |
| 3,277,393 | 10/1966 | Nicolai | 356—106 LR |
| 3,412,251 | 11/1968 | Hargrove | 356—106 LR |
| 3,485,559 | 12/1969 | DeMaria | 350—161 |
| 3,517,332 | 6/1970 | DeMaria | 350—161 |

OTHER REFERENCES

Harris et al., "Acousto-Optic Tunable Filter," J. Opt. Soc. Am., vol 59, No. 6 (June 1969), pp. 744–747.

Harris et al, "Electronically Tunable Acousto-Optic Filter," App. Phys. Lett. (Nov. 15, 1969), pp. 325–326.

DAVID SCHONBERG, Primary Examiner

P. R. MILLER, Assistant Examiner

U.S. Cl. X.R.

331—94.5; 350—157, 161; 356—106 LR

UNITED STATES PATENT OFFICE
CERTIFICATE OF CORRECTION

Patent No. 3,666,349     Dated May 30, 1972

Inventor(s) Laurence M. Hubby, Jr.

It is certified that error appears in the above-identified patent and that said Letters Patent are hereby corrected as shown below:

Column 2, line 52, "turnability" should read -- tunability --;

Column 3, line 64, "beans" should read -- beams --;

Column 4, line 27, "freyuency" should read -- frequency --; between lines 50 and 54, Eq. (1) should read --

$$f_o = \frac{c\, f_a}{V|\triangle n|}$$

--;

Column 5, line 63, "output beam" should read -- output beams --;

Column 6, lines 14-15, "resonant optical beam path 4" should read -- optical resonant beam path 4 --; line 25, after "6'" insert -- , --; line 26, "acusto-optic" should read -- acousto-optic --; line 29, after "$f_a$" delete -- , --; line 33, "resonant optical beam path 4" should read -- optical resonant beam path 4 --; line 35, "6', 6'' and which" should read -- 6', 6'', which --; line 36, after "6'" insert -- , --.

Signed and sealed this 12th day of September 1972.

(SEAL)
Attest:

EDWARD M. FLETCHER, JR.
Attesting Officer

ROBERT GOTTSCHALK
Commissioner of Patents